(12) United States Patent  
Kopikare et al.

(10) Patent No.: US 8,954,502 B1  
(45) Date of Patent: Feb. 10, 2015

(54) INFRASTRUCTURE DEVICES IN PEER-TO-PEER ENVIRONMENTS

(75) Inventors: Milind Kopikare, San Jose, CA (US); Sarang Shrikrishna Wagholikar, Sunnyvale, CA (US); Raja Banerjea, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 667 days.

(21) Appl. No.: 12/852,307

(22) Filed: Aug. 6, 2010

Related U.S. Application Data

(60) Provisional application No. 61/231,980, filed on Aug. 6, 2009, provisional application No. 61/233,110, filed on Aug. 11, 2009.

(51) Int. Cl.  
*G06F 15/16* (2006.01)  
*G06F 15/173* (2006.01)

(52) U.S. Cl.  
USPC .......................... 709/204; 709/209; 709/228

(58) Field of Classification Search  
CPC .................. H04L 29/06176; H04L 29/08144; H04L 29/08306; H04L 29/0836; H04L 29/08396; H04L 29/08423; H04L 29/08441; H04L 67/104; H04L 67/1061; H04N 21/632  
USPC ........................................................ 709/204  
See application file for complete search history.

(56) References Cited

U.S. PATENT DOCUMENTS

| | | | |
|---|---|---|---|
| 7,068,789 B2 * | 6/2006 | Huitema et al. | 380/277 |
| 7,489,643 B2 * | 2/2009 | Aggarwal et al. | 370/248 |
| 7,529,200 B2 * | 5/2009 | Schmidt et al. | 370/260 |
| 7,567,987 B2 * | 7/2009 | Shappell et al. | 1/1 |
| 7,610,373 B2 * | 10/2009 | Hasti et al. | 709/224 |
| 7,611,409 B2 * | 11/2009 | Muir et al. | 463/29 |
| 7,756,836 B2 * | 7/2010 | Aboulhosn et al. | 707/667 |
| 7,774,779 B2 * | 8/2010 | Seelig et al. | 718/100 |
| 7,788,522 B1 * | 8/2010 | Abdelaziz et al. | 714/4.1 |
| 7,818,020 B1 * | 10/2010 | Manroa et al. | 455/519 |
| 7,864,716 B1 * | 1/2011 | Manroa et al. | 370/260 |
| 7,899,921 B2 * | 3/2011 | Hill et al. | 709/230 |
| 7,921,194 B2 * | 4/2011 | Song et al. | 709/223 |
| 7,940,779 B2 * | 5/2011 | Giaretta et al. | 370/400 |
| 7,941,660 B2 * | 5/2011 | Lu et al. | 713/151 |
| 7,984,094 B2 * | 7/2011 | Riley et al. | 709/200 |

(Continued)

FOREIGN PATENT DOCUMENTS

EP 1526471 A1 * 4/2005

OTHER PUBLICATIONS

"Introduction to Windows Peer-to-Peer Networking," Microsoft Technet, Sep. 27, 2006, pp. 1-18.*

(Continued)

*Primary Examiner* — Melvin H Pollack

(57) ABSTRACT

A first message is received that includes a value indicative of a first timeout interval associated with configuring a second device to operate as a peer-to-peer (P2P) group owner or a P2P client in a P2P wireless network. A second timeout interval is determined based at least on the first timeout interval, and it is determined whether the second timeout interval expired. It is determined whether a second message is received from the second device prior to the second timeout interval expiring, and it is determined that a P2P connection with the second device failed based on a determination that the second message was not received from the second device prior to the second timeout interval expiring.

23 Claims, 9 Drawing Sheets

(56) References Cited

U.S. PATENT DOCUMENTS

| | | | | |
|---|---|---|---|---|
| 8,041,020 | B2* | 10/2011 | Drewry et al. | 379/211.01 |
| 8,135,392 | B2* | 3/2012 | Marcellino et al. | 455/418 |
| 8,166,520 | B2* | 4/2012 | Holm et al. | 726/3 |
| 8,195,715 | B2 | 6/2012 | Gies | |
| 8,208,973 | B2* | 6/2012 | Mehta | 455/574 |
| 2008/0189405 | A1* | 8/2008 | Zarenin et al. | 709/224 |
| 2008/0253327 | A1* | 10/2008 | Kohvakka et al. | 370/330 |
| 2009/0222530 | A1* | 9/2009 | Buford et al. | 709/217 |
| 2010/0271959 | A1* | 10/2010 | Qi et al. | 370/248 |
| 2010/0284330 | A1* | 11/2010 | Huang | 370/328 |
| 2010/0296441 | A1* | 11/2010 | Barkan | 370/328 |
| 2010/0306392 | A1* | 12/2010 | Fell et al. | 709/228 |
| 2010/0322213 | A1* | 12/2010 | Liu et al. | 370/338 |
| 2011/0010246 | A1* | 1/2011 | Kasslin et al. | 705/14.64 |
| 2011/0026504 | A1* | 2/2011 | Feinberg | 370/338 |
| 2011/0034127 | A1* | 2/2011 | Wentink et al. | 455/41.2 |
| 2012/0151089 | A1* | 6/2012 | Ponmudi et al. | 709/237 |

OTHER PUBLICATIONS

Wright, Maury. "Wi-Fi Direct adds Peer-to-Peer Capabilities to Ubiquitous Wireless Network Technology," Techzone: Wireless Solutions, Date Unknown, pp. 1-3.*

McKnight, LW et al. "Wireless Grids—Distributed Resource Sharing by Mobile, Nomadic & Fixed Devices," IEEE Internet Computing, vol. 8, Issue 4, Aug. 2004, pp. 24-31.*

Lua, Eng Keong. "A Survey and Comparison of Peer-to-Peer Overlay Network Schemes," IEEE Communications Surveys and Tutorials, vol. 7, Issue 2, Mar. 27, 2006, pp. 72-93.*

Kilmer, R. "Peering Beyond the PC where P2P Meets the Wireless Web," IEEE Internet Computing, vol. 6, Issue 3, May-Jun. 2002, p. 96.*

Kortuem, Gerd. "Proem: A Peer-to-Peer Computing Platform for Mobile Ad-Hoc Networks," Wearable Computing Laboratory, Dept. of Computer Science, University of Oregon, Banavar, 2001, pp. 1-6.*

Courcoubetis, Costas and Weber, Richard. "Asymptotics for Provisioning Problems of Peering Wireless LANs with a Large Numbers of Participants," Proceedings of WiOpt, 2004, pp. 1-10.*

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11a-1999 (Supplement to IEEE Std 802.11-1999) "Supplement to IEEE Standard for Information technology—Telecommunications and information exchange between systems—Local and metropolitan area networks —Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

"IEEE P802.11n™ D3.00, Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MC) and Physical Layer (PHY) Specifications: Amendment 5: Enhancements for Higher Throughput," *The Institute of Electrical and Electronics Engineers, Inc.*, Oct. 2009.

"Wi-Fi Peer-to-Peer (P2P) Technical Specification," version 1.00, *Wi-Fi Alliance*, pp. 1-10; 30-46; 62-70; 83-88, Dec. 1, 2009.

* cited by examiner

INFRASTRUCTURE DEVICES IN PEER-TO-PEER ENVIRONMENTS

CROSS-REFERENCES TO RELATED APPLICATIONS

The present application claims the benefit of U.S. Provisional Application No. 61/231,980 filed on Aug. 6, 2009 entitled "Legacy to P2P," and claims the benefit of U.S. Provisional Application No. Application No. 61/233,110 filed on Aug. 11, 2009 entitled "Legacy to P2P." both of which are hereby incorporated by reference herein in their entireties.

FIELD OF TECHNOLOGY

The present disclosure relates generally to peer-to-peer communication networks, and in particular, to integrating infrastructure devices into peer-to-peer communication networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many communication devices, such as portable computers, smart phones, wireless devices, and the like are configured to operate in wireless local area networks (WLANs) that operate according to communication protocols such as the IEEE 802.11a, b, g, and n standards. WLANs that require a dedicated access point (AP) that manages the network are often referred to as "infrastructure networks". Often, the AP is in a fixed location.

Unlike infrastructure networks, peer-to-peer (P2P) wireless networks do not require dedicated APs. Rather, in a P2P wireless network, a peer-to-peer group can be dynamically formed (e.g., independent of a fixed physical location) from a set of peer-to-peer-enabled wireless communication devices ("P2P devices"). One of the set of P2P devices operates as a P2P group owner of the P2P group, and the others in the set operate as P2P clients.

P2P wireless devices generally are backwards compatible with WLANs. That is, a P2P device is generally enabled to simultaneously support a complete set of P2P functionality and a complete set of infrastructure functionality. In this manner, as a P2P device moves, it may connect to a P2P wireless network or to an infrastructure WLAN. In some implementations, simultaneous connections to both a P2P and an infrastructure WLAN are possible.

SUMMARY

In one embodiment, a method includes receiving, using a transceiver of a first device, a first message including a value indicative of a first timeout interval associated with configuring a second device to operate as a peer-to-peer (P2P) group owner or a P2P client in a P2P wireless network. The method also includes determining a second timeout interval based at least on the first timeout interval, and determining whether the second timeout interval expired. Additionally, the method includes determining whether a second message is received from the second device prior to the second timeout interval expiring, and determining that a P2P connection with the second device failed based on determining that the second message was not received from the second device prior to the second timeout interval expiring.

In another embodiment, an apparatus comprises a transceiver, and a processor. The processor is configured to determine a first timeout interval associated with configuring a device separate from the apparatus to operate as a peer-to-peer (P2P) group owner or a P2P client in a P2P wireless network based on a first message received by the transceiver from the device separate from the apparatus. Additionally, the processor is configured to determine a second timeout interval based at least on the first timeout interval, and determine whether the second timeout interval expired. Also, the processor is configured to determine whether the transceiver received a second message from the device separate from the apparatus prior the second timeout interval expiring, and determine that a P2P connection with the device separate from the apparatus failed based on determining that the second message from the device separate from the apparatus was not received prior to the second timeout interval expiring.

In yet another embodiment, a method includes executing a first set of machine readable instructions stored in a memory of a wireless network adaptor using a processor of the wireless network adaptor to communicate over an infrastructure wireless local area network (WLAN) via an access point of the infrastructure WLAN, and executing a second set of machine readable instructions stored in the memory of the wireless network adaptor using the processor of the wireless network adaptor to perform a peer-to-peer (P2P) group owner negotiation with another P2P device via a P2P wireless network. The first set of machine readable instructions and the second set of machine readable instructions are stored in the memory of the wireless network adaptor simultaneously. The method also includes executing the second set of machine readable instructions stored in the memory of the wireless network adaptor using the processor of the wireless network adaptor to determine an identity of the wireless network adaptor as a P2P group owner or a P2P client, and downloading a third set of machine readable instructions to the memory of the wireless network adaptor when machine readable instructions for implementing functions corresponding to the determined identity are not stored in the memory. The method further includes reconfiguring the wireless network adaptor to operate in the P2P wireless network according to the determined identity.

In still another embodiment, an apparatus comprises a transceiver, a memory, and a processor coupled to the memory. Machine readable instructions stored in the memory, when executed by the processor, cause the processor to: cause the transceiver to communicate with an access point of an infrastructure wireless local area network (WLAN), cause the transceiver to transmit messages to a device separate from the apparatus, the messages corresponding to a peer-to-peer (P2P) group owner negotiation, determine an identity of the apparatus as a P2P group owner or a P2P client, download a set of machine readable instructions to the memory when machine readable instructions for implementing functions corresponding to the determined identity are not stored in the memory, and reconfigure the apparatus to operate in a P2P wireless network according to the determined identity.

DETAILED DESCRIPTION

Figure 1:
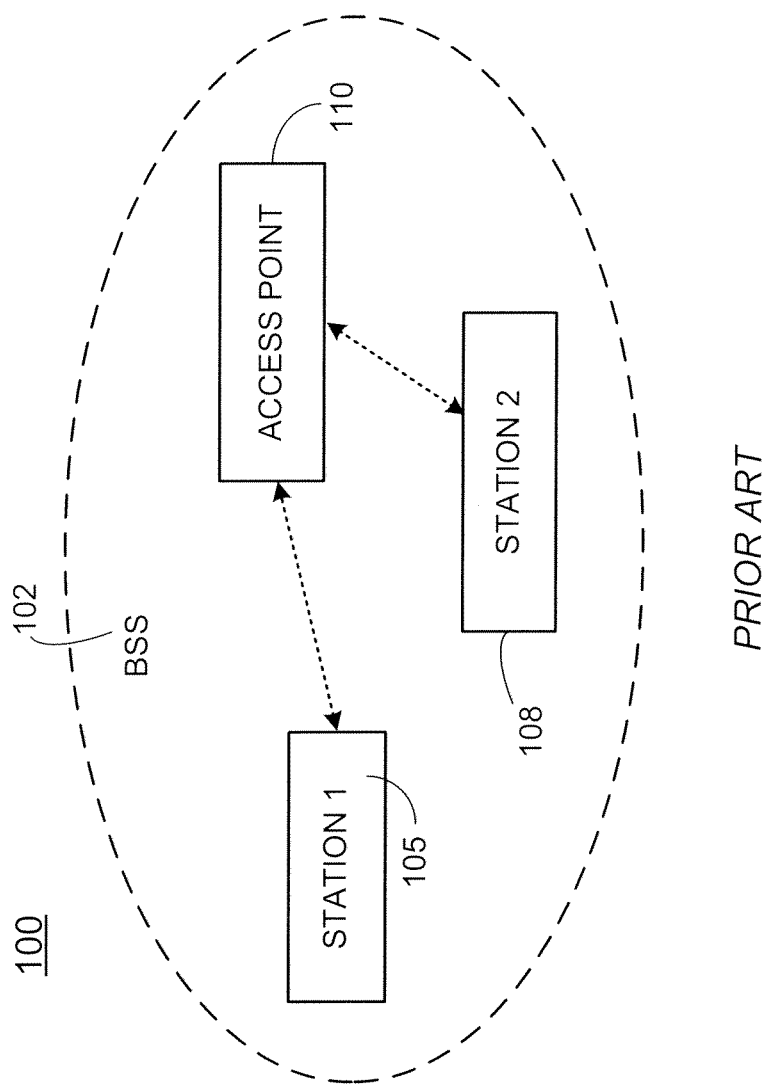
FIG. 1 depicts an infrastructure wireless local area network (WLAN)

FIG. 1 depicts a prior art infrastructure wireless local area network (WLAN) 100. Generally, the infrastructure WLAN 100 operates according to a WLAN communication protocol. In an embodiment, the WLAN protocol is in compliance with one or more approved IEEE 802.11 standards such as the IEEE 802.11-2009 standard or an older IEEE 802.11 standard. As used herein, the terms "infrastructure network" and "infrastructure WLAN" refer to a wireless network that includes a dedicated access point (AP) that coordinates and manages communication in the in the wireless network and that is coupled to another network such as a wired local area network (LAN), a wide area network (WAN), etc.

The infrastructure WLAN 100 includes a Basic Service Set (BSS) 102 including one or more stations (STAs) 105, 108 communicating with an access point (AP) 110. As generally understood, the infrastructure WLAN 100 requires the AP 110 to be dedicated to the BSS 102, and the STAs 105, 108 must communicate with the AP 110. Generally, the physical location of the AP 110 is relatively fixed, such as with a wireless hotspot.

Figure 2:
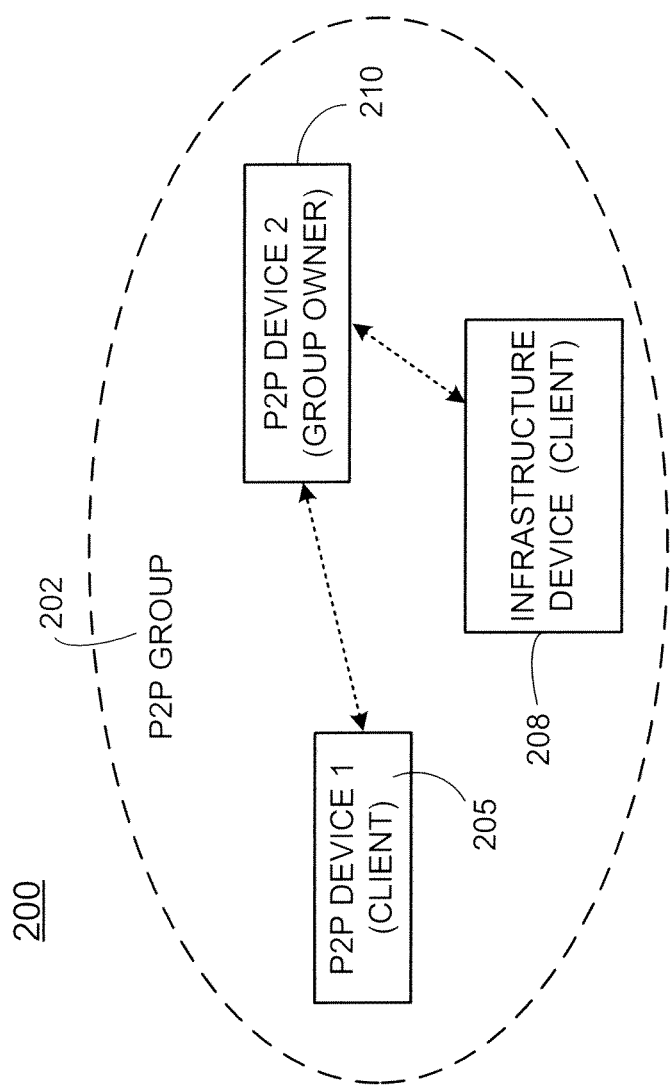
FIG. 2 depicts an embodiment of a peer-to-peer (P2P) wireless local area network.

FIG. 2 depicts a peer-to-peer (P2P) wireless network 200 according to an embodiment. Unlike the infrastructure WLAN 100 of FIG. 1, which includes a dedicated access point 110, a peer-to-peer group 202 can dynamically form and dissolve as P2P devices 205, 208 and 210 discover each other and leave the P2P network through time and space.

Generally, P2P discovery occurs when a first P2P device (e.g., the device 205) advertises itself as P2P device, for example, by including an indication that the device 205 is a P2P device in a beacon, a probe request, a probe response, or some other P2P transmission. As used herein, the term "P2P device" refers to a device configured to operate according to a known P2P communication protocol that defines certain P2P communications such as beacons, probe requests and responses, etc. When another P2P device (e.g., the device 210) finds the first P2P device 205 (i.e., comes within range and detects the advertisement transmitted by the P2P device 205), the two P2P devices 205, 210 perform a procedure defined by the communication protocol and referred to as P2P group owner negotiation. The P2P group owner negotiation results in one of the devices being determined to have a P2P identity of a P2P group owner (in the scenario illustrated by FIG. 2, the device 210), and the other device being determined to have a P2P identity of a P2P client (in the scenario illustrated by FIG. 2, the device 205). Both the P2P group owner 210 and the P2P client 205 are associated with the P2P group 202. After a successful P2P group owner negotiation, the determined P2P group owner 210 and P2P client 205 begin an authentication procedure defined by the communication protocol to establish a P2P connection.

In the example scenario of FIG. 2, a similar P2P group owner negotiation is performed between the devices 208 and 210, resulting in the device 210 assuming a P2P identity of the P2P group owner and the device 208 assuming a P2P identity of another P2P client in the P2P group 202.

If other P2P devices (not shown) discover the P2P group 202 via one of the P2P group members 205, 208, 210, the other P2P devices may join the P2P group 202. Any suitable number of P2P clients can be associated with the P2P group 202. In some cases, an addition of a new P2P device to the P2P group 202 can result in a change in P2P group ownership. At any time, an existing P2P client can disassociate itself with the P2P group 202, which may, in some cases, result in a change in P2P group ownership. In some embodiments, the P2P wireless network 200 includes more than one P2P group, and a P2P device can belong to more than one P2P group. In some embodiments, a P2P device can be a group owner in a first P2P group and a P2P client in a second P2P group simultaneously.

A P2P group owner (e.g., the device 210 of FIG. 2) generally manages the P2P group 202. Unlike an infrastructure AP (e.g., the AP 110 of FIG. 1), however, P2P group ownership is not dedicated but is temporal. In particular, the device with which the P2P group ownership is associated can dynamically change over time and/or space. For example, if the current group owner 210 leaves the group 202 (e.g., moves outside of range, powers off, etc.), the devices 205, 208 perform group owner negotiation and determine a new group owner. In some embodiments, the P2P group owner 210 provides one or more of Wi-Fi Protected Setup™ (WPS) internal registrar functionality, communication between P2P clients within the P2P group 202, and access to another P2P group for clients within the P2P group 202.

In an embodiment, a determined P2P client (e.g., the devices 205, 208) implements WPS enrollee functionality.

The P2P devices 210 and 205 are illustrated as being P2P devices that are configured to operate in the P2P wireless network environment 200. In an embodiment, each of the P2P devices 210 and 205 includes one or more configurations to support a complete set of P2P functionality, including P2P discovery, Wi-Fi Protected Setup™ (WPS), group owner negotiation, operation as a P2P client, operation as a P2P group owner, and other P2P functionality required by a P2P communication protocol. In an embodiment, one or more of the P2P devices 210 and 205 are also include one or more configurations to support an infrastructure WLAN communication protocol such as used with the infrastructure WLAN 100 of FIG. 1, and thus are backwards compatible with the infrastructure WLAN communication protocol.

While the P2P devices 210 and 205 are configured to be compatible with both P2P wireless networks and infrastructure WLANs, in an embodiment, the infrastructure device 208 is a WLAN device that was originally configured to be compatible with the infrastructure WLAN 100 of FIG. 1. Typically, the infrastructure device 208 was originally configured for infrastructure WLANs, and was originally configured prior to the advent of a P2P communication protocol. In an embodiment, the infrastructure device 208 is also configured, however, to provide minimal support of the P2P communication protocol, but not full support of the P2P communication protocol. For example, in an embodiment, the infrastructure device 208 can perform certain initial P2P communications, such as discovery and group owner negotiation, according to the P2P protocol, but is not capable of performing all required functions of the P2P protocol. In an embodiment, the infrastructure device 208 reconfigures itself to operate in the P2P wireless network 200 when it detects the P2P wireless network 200 and decides to join the P2P wireless network 200, for example. The reconfiguration of the infrastructure device 208 will be more thoroughly discussed in subsequent sections of the present disclosure.

Figure 3:
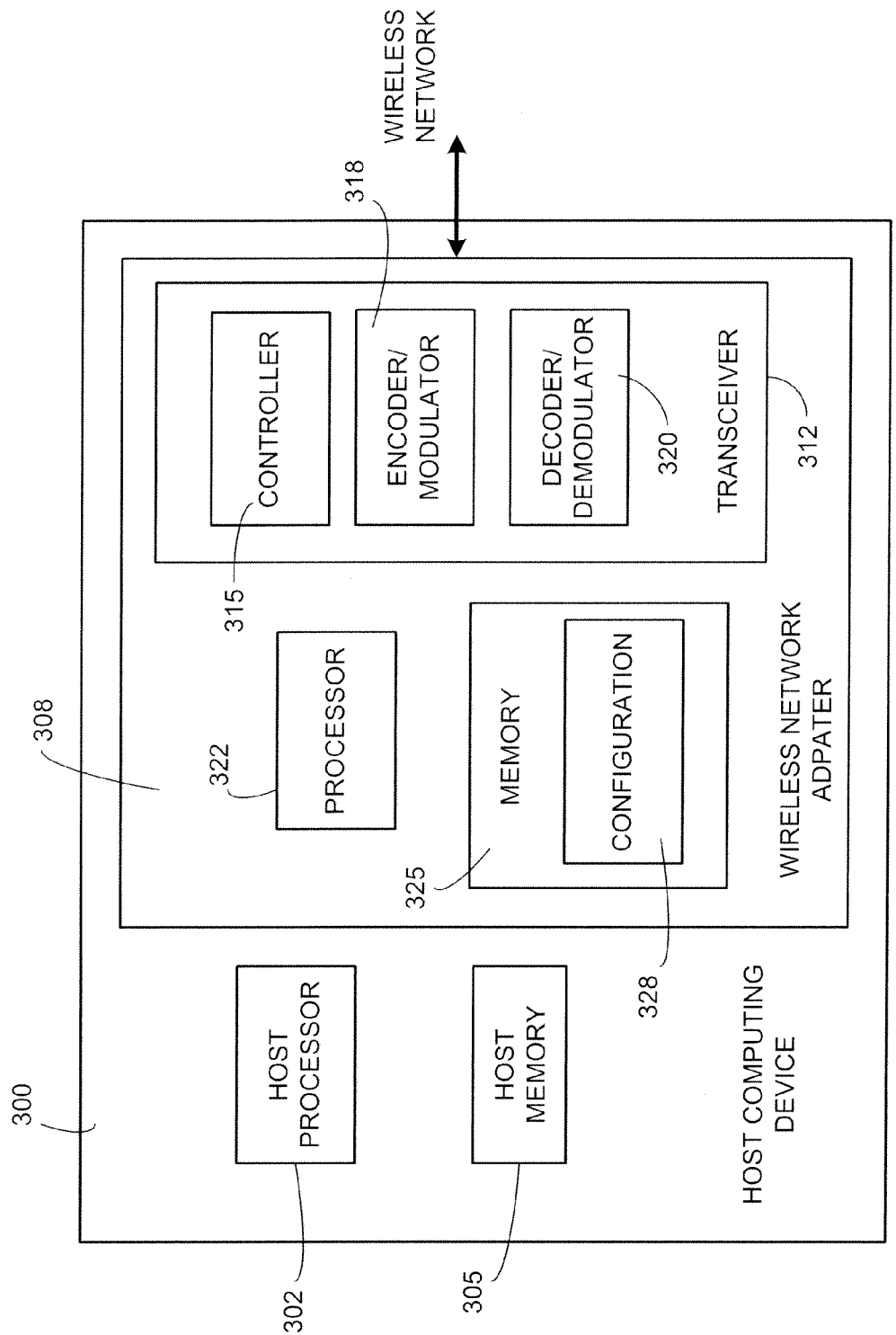
FIG. 3 is a block diagram of an example computing device configured for operation in a peer-to-peer wireless network.

FIG. 3 is a block diagram of a host computing device 300 that is configured for operation in a wireless network such as an infrastructure wireless local area network (e.g., the infrastructure WLAN 100 of FIG. 1) and/or a P2P network (e.g., the P2P network 200 of FIG. 2), according to an embodiment. The computing device 300 may be, for example, a general purpose computer, a portable computer (e.g., a laptop computer, a tablet computer, etc.), a video game console or gaming user device, a portable media device, a smart phone, a printer or other peripheral, a personal digital assistant, etc.

The host computing device 300 includes a host processor 302 and a host memory 305. According to an embodiment, the host processor 302 comprises a CPU (Central Processing Unit) and the host memory 305 includes computer storage media in the form of volatile and/or nonvolatile memory such as read only memory (ROM), random access memory (RAM), FLASH memory, etc. According to an embodiment, the host memory 305 stores system data, such as identifying and/or manufacturing information. The host memory 305 typically stores data and/or program modules that are immediately accessible to and/or presently being operated on by the host processor 302.

The host computing device 300 also includes a wireless network adaptor 308 via which the host computing device 300 is enabled to connect to a wireless local area network (WLAN) and/or a P2P network. In some embodiments, the wireless network adaptor 308 comprises a Wi-Fi Alliance certified device. The wireless network adaptor 308 includes a transceiver 312 that is communicatively coupled to the WLAN. The transceiver 312 sends messages to and receives messages from other devices in the infrastructure and/or the P2P wireless network. The transceiver 312 includes a controller 315, an encoder/modulator 318 for sending messages, and a decoder/demodulator 320 for receiving messages. In some embodiments of the wireless network adaptor 308, the transceiver 312 comprises a transmitter that includes a transmitter controller and the encoder/modulator 318, and a receiver that includes a receiver controller and the decoder/demodulator 320. In other words, the controller 315 comprises a transmitter controller and a receiver controller, in an embodiment. In an embodiment, the controller 315 includes a processor that executes computer readable instructions stored in the memory 325 or another memory (not shown) coupled to the processor. In an embodiment, the controller 315 is coupled to the memory 325. The controller 315 is coupled to the encoder/modulator 318 and the decoder/demodulator 312.

The wireless network adaptor 308 includes a processor 322 (e.g., a central processing unit) local to the wireless network adaptor 308 and a local memory 325 within which one or more configurations 328 are stored. The processor 322 is coupled to the memory 325. In an embodiment, the one or more configurations 328 of the wireless network adaptor 308 are downloaded from the host memory 305 of the host computing device 300. In this embodiment, the memory 325 is coupled to the host memory 305. The local processor 322 of the wireless network adaptor 308, the controller 315 (when it comprises a processor that executes machine readable instructions) or some combination of the two execute instructions according to the downloaded configuration 328 to support operation of the host computing device 300 in the WLAN and/or the P2P network.

In some embodiments, the host computing device 300 is configurable to operate as a P2P device, such as the devices 205, 208 or 210 of FIG. 2. In these embodiments, the host computing device 300 downloads one or more configurations 328 into the local memory 325 of the wireless network adaptor 308 that allow the host computing device 300 to operate in an infrastructure network, or a P2P wireless network. In an embodiment, the one or more configurations 328 include machine readable instructions for performing all P2P functionality required by the P2P protocol, including discovery, WPS, group owner negotiation, operation as a P2P client, operation as a P2P group owner, and other required P2P functionality. In an embodiment, the one or more configurations 328 include machine readable instructions for performing functions that enable the host computing device 300 to alternatively and/or simultaneously operate in an infrastructure WLAN (such as embodiments the infrastructure WLAN 100 of FIG. 1). In an embodiment, the one or more configurations 328 supporting both the operation of the host device 300 in the infrastructure WLAN and the operation of the host device 300 in the P2P wireless network are jointly stored on the local memory 325 of the wireless network adaptor 308.

In some embodiments, the wireless network adaptor 308 is adapted to operate in an infrastructure network, and the host device 300 is an infrastructure device, such as the device 208 of FIG. 2. In some embodiments, a wireless network adaptor 308 adapted to operate in an infrastructure network was initially released into the market prior to the advent of the P2P wireless communication protocol. As a result, such a wireless network adaptor 308 of an infrastructure device ("infrastructure wireless network adaptor") does not have sufficient memory 325 to store the one or more configurations that are necessary to support both operation of the infrastructure device in infrastructure WLANs and operation of the infrastructure device in P2P wireless networks, according to an embodiment. Additionally or alternatively, the wireless network adaptor 308 of the infrastructure device does not have sufficient computational horsepower to reconfigure itself for operation of the infrastructure device in P2P wireless networks in a timely manner, according to an embodiment. For example, while the infrastructure device is reconfiguring, another P2P device may assume that an attempt to connect with the infrastructure device has failed, leading to delays in establishing a P2P connection between the infrastructure device and the P2P device. Embodiments of methods, systems and devices described below enable such infrastructure devices to better operate in peer-to-peer environments, such as P2P wireless networks.

Figure 4A:
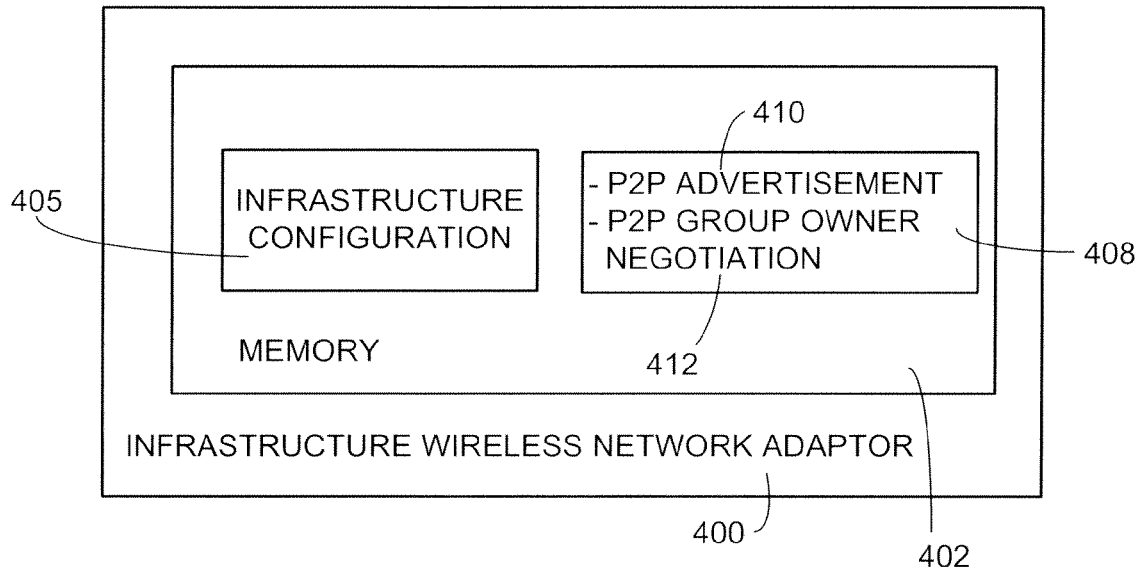
FIGS. 4A and 4B are block diagrams of an example infrastructure wireless network adaptor configured for operation in a peer-to-peer wireless network.
Figure 4B:
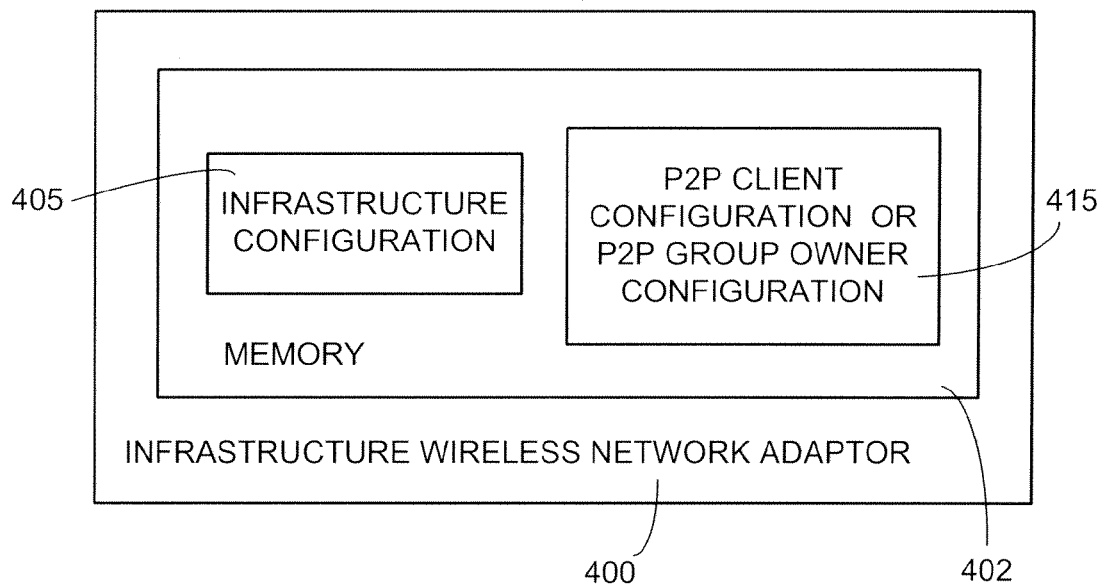

For example, FIGS. 4A and 4B illustrate block diagrams of an exemplary infrastructure wireless network adaptor 400 that is configured to operate in a P2P wireless network, such as the P2P wireless network 200 of FIG. 2. The adaptor 400 is an embodiment of the wireless network adaptor 308 of FIG. 3 and includes the same components of the adaptor 308 illustrated in FIG. 3. FIGS. 4A and 4B are simplified figures in that they omit other components of the adaptor 400 such as the processor and the transceiver.

FIG. 4A illustrates the infrastructure wireless network adaptor 400 after initialization. The infrastructure wireless network adaptor 400 includes a memory 402 that is insufficiently-sized to store both an infrastructure configuration 405 and a P2P configuration that provides a complete set of peer-to-peer functionality (i.e., it does not support all functions required by the P2P protocol). As previously discussed, according to an embodiment, the complete set of peer-to-peer functionality includes functionality for P2P discovery, WPS, group owner negotiation, operation as a P2P client, operation as a P2P group owner, and other functionality required by the P2P protocol.

During initialization, the infrastructure configuration 405 is downloaded into the memory 402 of the adaptor 400. The infrastructure configuration 405 enables the adaptor 400 to operate in infrastructure WLANs. Additionally, due to the insufficient size of the memory 402, during initialization only a portion 408 of complete peer-to-peer functionality is downloaded into the memory 402 of the adaptor 400. In this illustrated embodiment, the portion 408 of peer-to-peer functionality includes P2P advertisement functionality configuration 410 and P2P group owner negotiation functionality configuration 412. In other embodiments, another subset of the complete P2P functionality is downloaded. In an embodiment, at least the P2P group owner negotiation functionality 412 is downloaded during the initialization of the adaptor 400. The P2P advertisement functionality configuration 410 and the P2P group owner negotiation functionality configuration 412 include computer readable instructions that enable the wireless network adaptor 400 to perform P2P advertisement functions and P2P group owner negotiation functions, respectively.

The P2P group owner negotiation functionality configuration 412 enables the infrastructure wireless network adaptor 400 to perform P2P group owner negotiation with another P2P device in the P2P wireless network. In an embodiment according to FIG. 4A, the P2P group owner negotiation functionality 412 is performed with another P2P device, for example, after the adaptor 400 has advertised itself as a P2P device using the P2P advertisement functionality 410.

The P2P group owner negotiation results in a determination of a P2P identity of the host computing device associated with the infrastructure wireless network adaptor 400 and a P2P identity of the other P2P device. That is, the P2P group owner negotiation determines which of the host computing device and the other P2P device is to be the P2P group owner, and which is to be the P2P client. Upon the determination of its P2P identity (be it P2P group owner or P2P client), the infrastructure wireless network adaptor 400 re-configures itself in accordance with determined P2P identity, as illustrated in FIG. 4B, according to an embodiment. A configuration 415 corresponding to the determined P2P identity of the host computing device is downloaded from the host computing device into the memory 402, thus enabling the adaptor 400 (and thus, the host computing device) to operate within the P2P wireless network in the appropriate identity (e.g., P2P group owner or P2P client). Note that in the embodiment of FIG. 4B, the infrastructure configuration 405 is maintained in the memory 402 even after the adaptor 400 has been re-configured with its determined P2P identity 415. Accordingly, the adaptor 400 is enabled to be simultaneously operational in both a P2P wireless network and in an infrastructure WLAN.

In some embodiments, the memory 402 of the infrastructure wireless network adaptor 400 may be so small that only either the configuration corresponding to the determined P2P identity 415 or the infrastructure configuration 405 may be stored at any instant in time. In these embodiments, the adaptor 400 (and thus, the host computing device) is limited to only connecting to either a P2P wireless network or to an infrastructure WLAN, but is not able to simultaneously connect to both. If the adaptor 400 is in communication with a P2P wireless network and subsequently desires to connect to an infrastructure WLAN, the adaptor 400 must disconnect from the P2P wireless network and perform another reconfiguration to restore the infrastructure configuration 405 into the memory 402 (e.g., to restore the configuration illustrated FIG. 4A.) In an embodiment, only a subset of the infrastructure configuration 405 is maintained in the memory 402 when the adaptor 400 is configured to operate as a P2P device. For example, the subset of the infrastructure configuration 405 provides functionality to enable the adaptor 400 to detect an infrastructure network and to reconfigure itself to operate in the infrastructure network, according to an embodiment. Reconfiguring to operate in the infrastructure network includes downloading the full configuration 405 or a remaining subset of the configuration 405 from the host computing device into the memory 402, according to an embodiment.

Referring again to FIG. 3, in some embodiments, the memory 325 is sufficient to store all necessary configurations or more than one configuration. For example, the memory 325 is sufficient to store at least two of a configuration to allow the device 300 to operate in an infrastructure network, a configuration to allow the device 300 to operate in a P2P network as a P2P group owner, and a configuration to allow the device 300 to operate in a P2P network as a P2P client.

Figure 5:
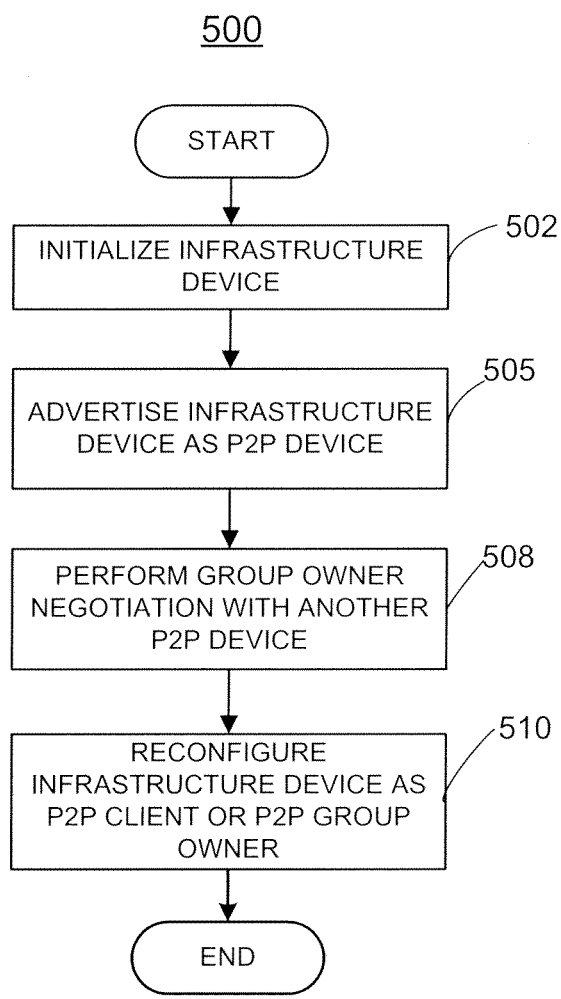
FIG. 5 is an embodiment of a method of connecting an infrastructure WLAN device into a P2P environment.

FIG. 5 is a flow diagram of a method 500 for integrating an infrastructure device into a P2P environment, such as integrating an infrastructure WLAN device into a P2P wireless network environment, according to an embodiment. Embodiments of the method 500 may operate in conjunction with an infrastructure network, such as the WLAN 100 of FIG. 1, a P2P network, such as the P2P wireless network 200 of FIG. 2, a host computing device such as the host computing device 300 of FIG. 3, and/or a wireless network adaptor such as the wireless network adaptor 400 of FIG. 4.

At block 502, the infrastructure device is initialized. According to an embodiment, initializing the infrastructure device includes downloading, into a wireless network adaptor hosted on the infrastructure device, one or more configurations corresponding to performing a portion of peer-to-peer functionality. According to an embodiment, the downloaded one or more configurations provides at least functionality for performing P2P group owner negotiation is downloaded at block 502. In another embodiment, the downloaded one or more configurations provides both functionality for performing P2P advertising and functionality for performing P2P group owner negotiation. According to an embodiment, the downloaded one or more configurations provides for operating the infrastructure device in an infrastructure WLAN. In an embodiment, the subset of peer-to-peer functionality that is downloaded into the wireless network adapter of the infrastructure device is selectable.

The downloaded functionality to support operation in the infrastructure WLAN and to support the portion of the P2P functionality is stored on the wireless network adapter in more than one configuration, or they may be jointly stored in a single configuration.

In an embodiment according to FIG. 3, block 502 includes downloading the one or more configurations from the host memory 305 to the memory 325. In another embodiment, block 502 includes downloading the one or more configurations to the memory 325 when the network adaptor 308 is not integrated with the host device 300 (such as at a manufacturing facility).

At block 505, the infrastructure device advertises itself as a P2P device. In an embodiment in which configuration data that provides P2P advertising functionality was not downloaded at block 502, the block 505 is omitted. The block 502 is also omitted, according to an embodiment, if the infrastructure device receives P2P messages from another device prior to implementing block 505. Advertising the infrastructure device 505 includes transmitting a signal that identifies the infrastructure device as a P2P device. The identification may be included in a beacon, in a probe request, in a probe response, or in some other suitable P2P transmission that is sent by the infrastructure device.

At block 508, P2P group owner negotiation is performed with another P2P device. Performing P2P group owner negotiation includes transmitting an indication of a strength of a preference of the infrastructure device to be the P2P group owner (e.g., "group owner intent"). In an embodiment, performing P2P group owner negotiation also includes receiving an indication of a strength of a preference of the other device to be the P2P group owner. In an embodiment, performing P2P group owner negotiation also includes transmitting an indication of a time interval required to configure the infrastructure device to operate in the P2P network. In an embodiment, performing P2P group owner negotiation includes transmitting at least one of an indication of a time interval required to configure the infrastructure device to be a P2P group owner, and an indication of a time interval required to configure the infrastructure device to be a P2P client. As a result of the P2P group owner negotiation, either the infrastructure device or the other P2P device is determined to be the P2P group owner, and the remaining device is determined to be the P2P client. Additional details of block 508 are provided in a later section of the present disclosure.

At block 510, the wireless network adapter of the infrastructure device is reconfigured to assume the P2P identity (e.g., P2P group owner or P2P client) determined as a result of block 508. According to an embodiment, reconfiguring the infrastructure device 502 includes downloading, into the wireless network adapter, one or more configurations corresponding to operating the infrastructure device as the determined P2P identity. According to the embodiment of FIG. 3, reconfiguring the infrastructure device 502 includes downloading, from the host memory 305 to the memory 325, one or more configurations corresponding to operating the infrastructure device as the determined P2P identity. Using its determined P2P identity, the infrastructure device may then begin authentication to further establish a connection with the other P2P device.

According to an embodiment, the method 500 is implemented at least partially by the host device 300. For example, according to an embodiment, the processor 322 initializes the wireless adaptor 308 (block 502). In this embodiment, the processor 322 causes configuration data to be downloaded from the host memory 305 to the memory 325. In other embodiments, another device, such as the host processor 302 or a manufacturing apparatus, initializes the wireless adaptor 308 and/or causes configuration data to be downloaded from the host memory 305 or some other source to the memory 325.

In an embodiment, the processor 322 causes the transceiver 312 to advertise the device (block 505). In this embodiment, the processor 322 causes the transceiver 312 to transmit messages and the processor 322 interprets messages received by the transceiver 312 from another P2P device during group owner negotiation (block 508). The processor 322 causes the wireless adaptor 308 to reconfigure as a P2P device (block 510). In this embodiment, the wireless adaptor 308 causes configuration data to be downloaded from the host memory 305 to the memory 325. In other embodiments, the host processor 302 causes the wireless adaptor 308 to reconfigure itself and/or causes configuration data to be downloaded from the host memory 305 to the memory 325.

According to an embodiment, the processor 322 at least partially implements the method 500 by executing machine readable instructions stored in the memory 325 or another memory (not shown in FIG. 3). In another embodiment, the processor 322 comprises hardware, such as an application specific integrated circuit (ASIC), a custom integrated circuit, a field programmable gate array (FPGA), a programmable logic array (PLA), a complex programmable logic device (CPLD), etc., and is configured to at least partially implement the method 500 as discussed above.

Figure 6:
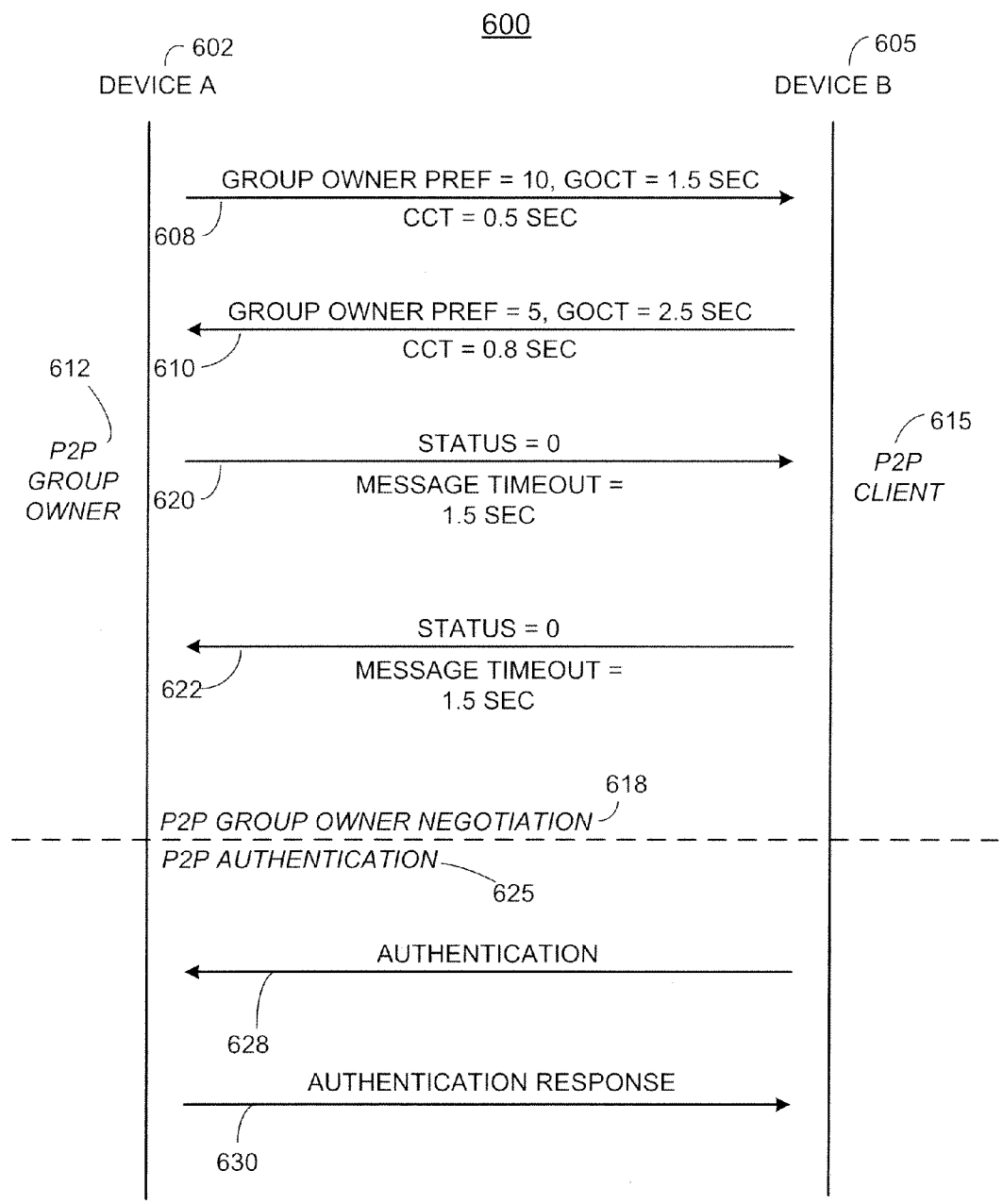
FIG. 6 is an example of a message flow between two devices in a P2P wireless network.

FIG. 6 is an example of a message exchange 600 between two devices 602, 605 in a peer-to-peer environment, such as the P2P wireless network 200 of FIG. 2. In particular, FIG. 6 illustrates a message flow 600 that is used when performing peer-to-peer group owner negotiation. According to an embodiment, at least one of the devices 602 and 605 is a host device such as the host computing device 300 of FIG. 3. As one example, the device 602 is a P2P device such as the device 205 or 210 of FIG. 2, and the device 605 is an infrastructure device enabled for operation in a P2P environment, such as the device 208 of FIG. 2 or the device 300 of FIG. 3. As another example, the device 605 is a P2P device such as the device 205 or 210 of FIG. 2, and the device 602 is an infrastructure device enabled for operation in a P2P environment, such as the device 208 of FIG. 2 or the device 300 of FIG. 3. According to an embodiment, the message flow 600 may operates in conjunction with the method 500 of FIG. 5. For example, the block 508 of FIG. 5 includes a message exchange such as the message exchange 600, according to an embodiment. In other embodiments, the message exchange 600 is utilized in conjunction with methods other than the method 500.

The message flow 600 may occur after devices 602 and 605 have discovered each other in a P2P wireless network (not shown). After discovery, each of the devices 602 and 605 begins the P2P group owner negotiation and transmits a respective message 608, 610. Although in FIG. 6, the message 608 is illustrated as being sent prior to the message 610, this is merely for clarity of illustration. In an embodiment, the initiation of the sending of the message 610 is not dependent on the sending or the receipt of the message 608. Similarly, in an embodiment, the initiation of the sending of the message 608 is not dependent on the sending or the receipt of the message 610.

According to an embodiment, the messages 608, 610 each include an indication of a strength of a preference of the sending device (602 and 605, respectively) to be a P2P group owner (e.g., a group owner intent or a group owner preference). In some embodiments, the indication of the strength of the preference is numerical, with a higher value corresponding to a stronger preference and a lower number corresponding to a lower preference. In other embodiments, the strength of the preference is indicated in other ways.

According to an embodiment, the messages 608, 610 each also include an indication of a group owner configuration timeout interval (GOCT) corresponding to a time interval required to configure or reconfigure the sending device to be a P2P group owner. For some devices, such as a P2P device, such as devices 210 and 205 of FIG. 2, the GOCT is substantially zero or null, as the devices 210, 205 include, a priori, a configuration supporting a P2P group owner identity. For an infrastructure device, such as device 208 of FIG. 2 or the device 300 of FIG. 3, the GOCT is typically a non-zero amount of time that is required to download a P2P group owner configuration into a corresponding wireless network adaptor, and to reinitialize the corresponding wireless network adaptor with the downloaded configuration.

According to an embodiment, the messages 608, 610 each also include an indication of a client configuration timeout interval (CCT) corresponding to a time interval required to configure or reconfigure the sending device to be a P2P client. For some devices, such as a P2P device, such as devices 210 and 205 of FIG. 2, the CCT is substantially zero or null, as the devices 210, 205 include, a priori, a configuration supporting a P2P client identity. For an infrastructure device, such as device 208 of FIG. 2 or the device 300 of FIG. 3, the CCT is typically a non-zero amount of time that is required to download a P2P client configuration into a corresponding wireless network adaptor and to reinitialize the corresponding wireless network adaptor with the downloaded configuration.

According to an embodiment, the device 602 is a device such as the host device 300. In this embodiment, the processor 322 causes the transceiver 312 to transmit the messages 608, 620, and 630. The processor 322 processes data received by the transceiver 312 from the device 605 in messages 610, 622, and 628.

According to an embodiment, the device 605 is a device such as the host device 300. In this embodiment, the processor 322 causes the transceiver 312 to transmit the messages 610, 622, and 628. The processor 322 processes data received by the transceiver 312 from the device 602 in messages 608, 620, and 630.

Figure 7A:
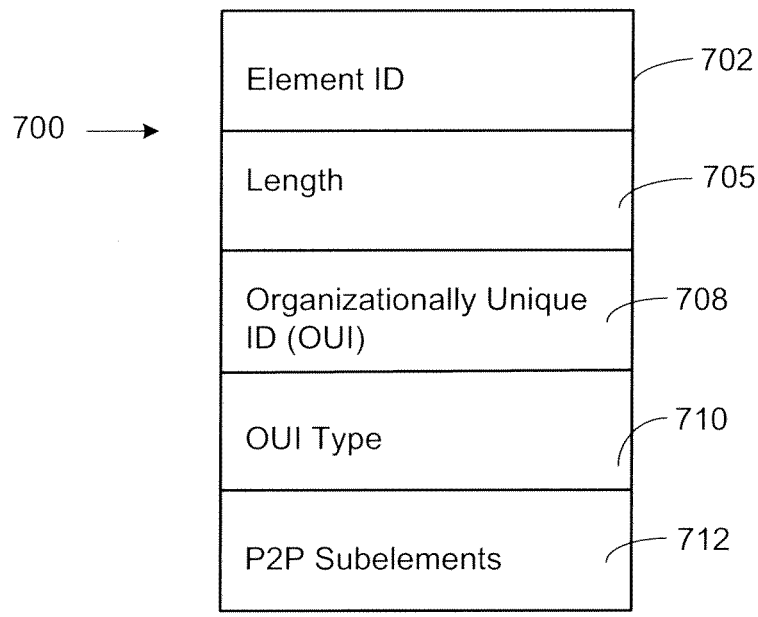
FIGS. 7A and 7B illustrate an exemplary P2P Information Element (IE) field in a peer-to-peer message.
Figure 7B:
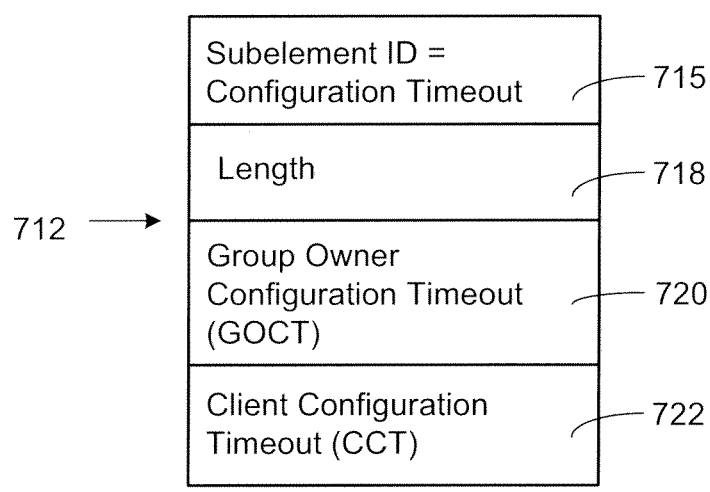

In some embodiments, the GOCT and the CCT are included in a P2P Information Element field of a management frame of a peer-to-peer message. FIGS. 7A and 7B provide details of an example P2P Information Element (IE) field 700 of a peer-to-peer message, according to an embodiment. In some embodiments, the P2P IE field 700 is included in the P2P message by using a Vendor Specific Information Element format with an OUI (Organizationally Unique Identifier) and an OUI Type that indicate "peer-to-peer." In an embodiment, the P2P IE field 700 is used in conjunction with the message flow 600, for example.

In the example illustrated by FIG. 7A, the P2P IE field 700 includes an element identification field 702. In an embodiment, the element identification field 702 corresponds to a vendor specific usage, for example, a vendor specific usage as defined in an IEEE 802.11 standard. In an embodiment, the element ID 702 has a size of one octet and has a hexadecimal value of "0xDD" or another hexadecimal value corresponding to a desired vendor specific usage element. In other embodiments, the size of the element ID 702 is a suitable size different than one octet.

The P2P IE field 700 also includes a length field 705 corresponding to the length of subsequent fields 708, 710 and 712. According to an embodiment, the length field 705 has a size of one octet and the value of the length field 705 indicates the total length of the subsequent fields 708, 710 and 712.

The P2P IE field 700 includes an Organizationally Unique ID (OUI) 708. The OUI 708 has a size of three octets, and may be assigned a value corresponding to "peer-to-peer." In one example, the value of the OUI 708 for peer-to-peer is assigned by a certifying body or other third party, such as the Wi-Fi Alliance (WFA), and has a hexadecimal value of "00 50 F2" or another suitable value.

Similarly, the P2P IE field 700 includes an OUI type 710. The OUI type 710 has a length of one octet, and its value indicates peer-to-peer, a type or version of a peer-to-peer communication protocol, or a type or version of the P2P Information Element. In one instance, a value of "0x09" hexadecimal, or some other suitable value, indicates WFA P2P version 1.0.

The P2P subelements field 712 is of variable length and defines one or more subelements of the P2P Information Element field. The P2P subelements field 712 includes a subelement identification (ID), a length, and a body field that includes subelement specific information.

In an embodiment, the length field 705 is set to four plus the length of the P2P subelements field 712. In another embodiment, the length field 705 indicates the length of the P2P subelements field 712 and is set to the length of the P2P subelements field 712.

FIG. 7B is a diagram illustrating an embodiment of the P2P subelements field 712. According to the embodiment of FIG. 7b, the P2P subelements field 712 includes a subelement ID field 715. The subelement ID field 715 is set to one of a plurality of values to indicate a type of P2P subelement. In FIG. 7B, the subelement ID field 715 is illustrated as being set to a value indicating "Configuration Timeout". The subelement ID 715 has a length of one octet. A length field 718 indicates a length of subsequent fields 720, 722 in the subelement 712, and itself has a length of one octet.

The Group Owner Configuration Timeout (GOCT) field 720 indicates a time interval required by a device to configure to operate as a P2P group owner. The GOCT field 720 has a length of one octet, and indicates the time interval in a given unit, e.g., units of 10 milliseconds. Similarly, the Client Configuration Timeout (CCT) field 722 indicates a time interval required by the device to configure to operate as a P2P client. The CCT 722 has a length of one octet, and may indicate the time interval in given units the same as or similar to those used in the GOCT 720. In some cases, the device sets GOCT and CCT to zero, such as when the device is a P2P device that simultaneously includes both a P2P client and a P2P group owner configuration and/or if the device can reconfigure in less than minimum time period, such as less than one millisecond, two milliseconds, three milliseconds, four milliseconds, five milliseconds, etc., or some other suitable minimum time period. In some cases, the device sets one of GOCT and CCT to zero, such as when the device is already configured as a P2P group owner or a P2P client.

Turning back to FIG. 6, based on the content of the messages 608, 610, each device 602, 605 independently determines which device is to be the P2P group owner and which device is to be the P2P client. Generally, the device with a stronger preference to be the P2P group owner is determined to be the P2P group owner, and details of this determination logic is more fully provided in FIGS. 8A and 8B. With regard to scenario illustrated in FIG. 6, device 602 is determined to be the P2P group owner 612 and device 605 is determined to be the P2P client 615, as the Group Owner Preference of device 602 indicated in the message 608 is greater that the Group Owner Preference of device 605 indicated in the message 610 (i.e., 10>5).

In some embodiments, after determining or establishing respective P2P identities 612, 615, P2P group owner negotiation 618 includes the device 602 and/or the device 605 transmitting an additional message (620 or 622, respectively) containing an indication of a message timeout interval. The message timeout interval reflects a maximum amount of time after re-configuration (if performed) that the transmitting device expects to wait before receiving a subsequent message corresponding to authentication, or any other message. In the scenario illustrated in FIG. 6, device 602 requires more time to configure as a group owner (as indicated by GOCT=1.5 seconds in the message 608) than device 605 requires to configure as a client (as indicated by CCT=0.8 seconds in the message 610). Thus, the message timeout interval is independently determined and set to 1.5 seconds in each of the messages 620 and 622. In some embodiments, the message timeout interval is indicated in a P2P status message. In some embodiments, the message timeout interval is indicated in a P2P IE field, such as illustrated in FIG. 7A.

After the sending of the messages 620 and 622, if no subsequent message corresponding to authentication is received during the message timeout interval, the message timeout interval is re-set a given number of times before the connection between the two devices is deemed a failure, according to an embodiment. In another embodiment, the connection between the two devices is deemed a failure after only one timeout interval.

In some embodiments, P2P group owner negotiation 618 ends after the P2P identities 612, 615 are established. In these embodiments, one or both of the messages 620 and 622 are omitted from the message flow 600.

Whether or not the messages 620 and 622 are sent, sufficient time is allotted in order for both devices to reconfigure (if necessary) to support their determined P2P identities (whether P2P group owner or P2P client) before continuing to establish a connection between the two devices. For example, in FIG. 6, device 602 requires more time to configure as a group owner (as indicated by GOCT=1.5 seconds in the message 608) than device 605 requires to configure as a client (as indicated by CCT=0.8 seconds in the message 610). Thus, in FIG. 6, both devices 602 and 605 wait for the maximum reconfiguration time between them (in this case, 1.5 seconds for the GOCT of device 602) before attempting to proceed with establishing a connection.

In the scenario depicted by the message flow 600, the devices 602, 605 successfully connect and progress to P2P authentication 625. In particular, the P2P client 615 initiates authentication 625 by transmitting an authentication message 628 to the P2P group owner 612, and based on the received authentication message 628, the P2P group owner 612 returns an authentication response 630 to the P2P client 615. Subsequent messaging and actions to further advance authentication and to establish the connection between the devices 602 and 605 typically ensue (not shown).

In other embodiments, instead of proceeding to authentication 625, upon a successful P2P group owner negotiation 618, other messages are transmitted between the devices 602, 605. For example, the client 615 sends a probe message. As another example, either the group owner 612 or the client 615 sends a subsequent status message or a subsequent error message that is unrelated to the P2P group owner negotiation 618.

Figure 8A:
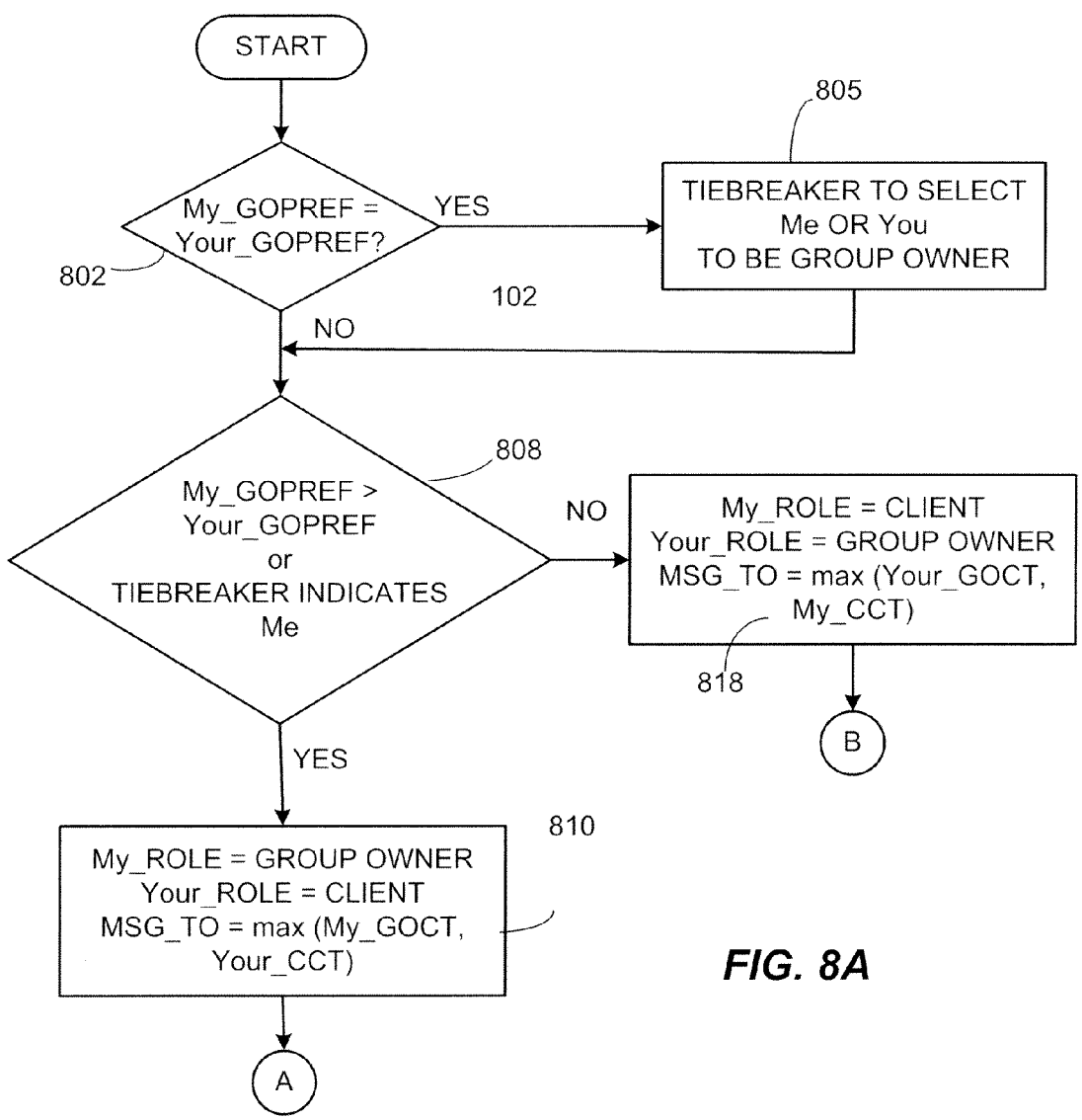
FIGS. 8A and 8B illustrate an embodiment of a method for determining a P2P identity of a device.
Figure 8B:
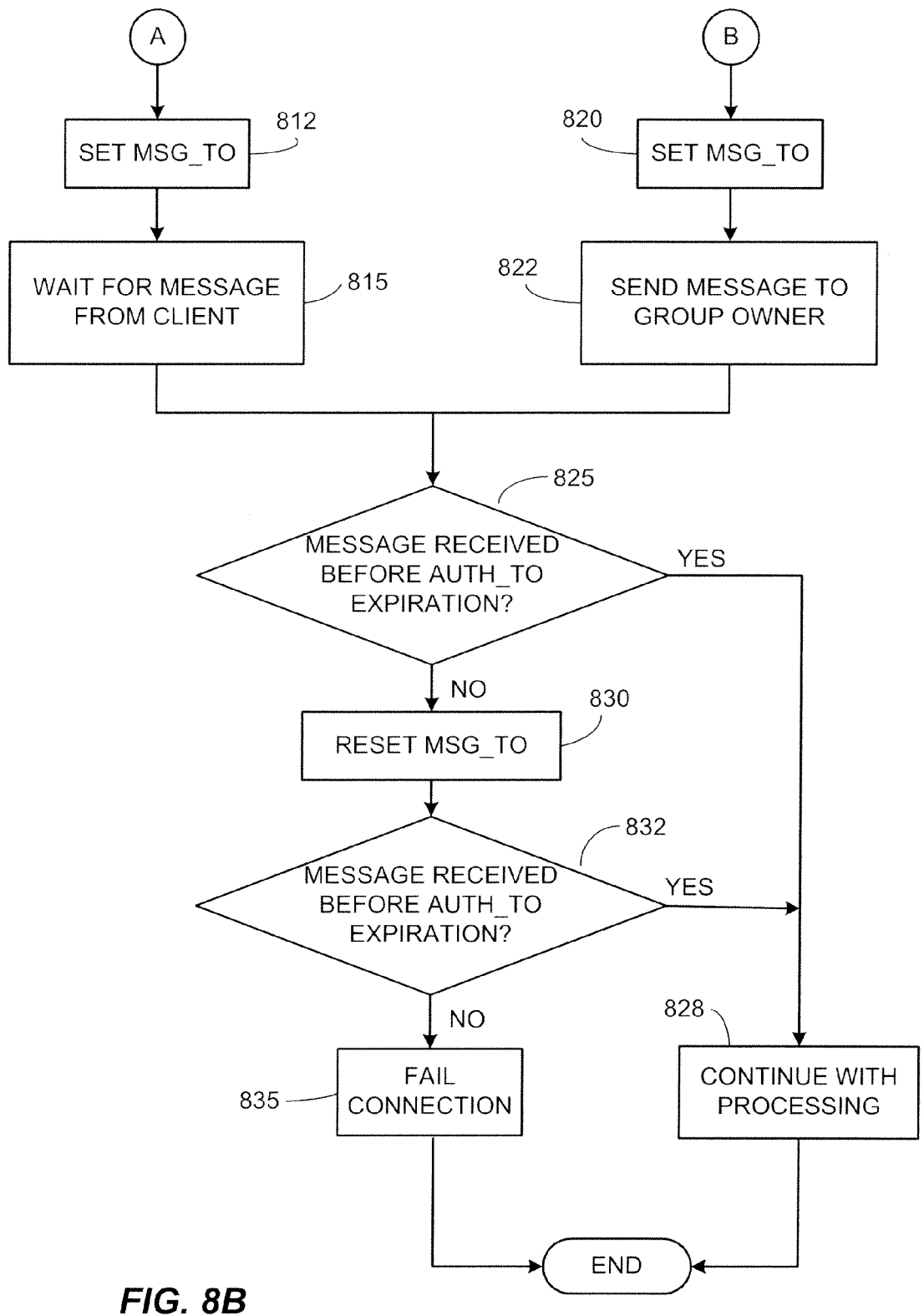

FIGS. 8A and 8B are a flow diagram of a method 800 for determining a peer-to-peer identity of a device, or determining whether the device is to be a P2P group owner or a P2P client, according to an embodiment. The method 800 is performed, for example, by one or more of devices 205, 208, 210 of FIG. 2, device 300 of FIG. 3, and the device 602 of FIG. 6 after sending the message 608 and/or receiving the message 610, according to some embodiments. Similarly, the method 800 is performed by the device 605 after sending the message 610 and/or receiving the message 608, according to an embodiment. In some embodiments, the method 800 is performed at a device without sending/receiving any messages that indicate a group owner preference value at all, such as when group owner preference values, GOCTs and CCTs are known a priori or are obtainable without messaging (e.g., via a database read).

The naming conventions used in FIGS. 8A and 8B are from the perspective of the device executing the method 800. In particular, "My" or "Me" refers to a first device executing the method 800, and "Your" or "You" refers to a second device with which the first device is communicating.

At block 802, it is determined whether the strengths of preferences of each of the first and second devices to be the P2P group owner are equal. If, at the block 802, it is determined that the strengths are equal (My_GOPREF=Your_GOPREF), then a tiebreaker or tie-breaking mechanism is performed 805 to select either the first device or the second device to be the P2P group owner. In some embodiments, the tiebreaker 805 includes an alternating mechanism for selection. In some embodiments, the tiebreaker 805 includes a pseudo-random selection such that both the first device and the second device reach the same determination.

At block 808, if the preference strength of the first device is greater than the preference strength of the second device (My_GOPREF>Your_GOPREF), or if the first device was selected by the tiebreaker at block 805, the method 800 continues to block 810. At block 810, the first device is determined to be the P2P group owner (My_ROLE=GROUP OWNER) and the second device is determined to be the P2P client (Your_ROLE=CLIENT). Further, at the block 810, the message timeout interval is determined to be the greater of the GOCT of the first device and the CCT of the second device (MSG_TO=max (My_GOCT, Your_CCT). Continuing on to FIG. 8B, the message timeout interval is correspondingly set at block 812, and, as the first device has been determined to be the P2P group owner, the method 800 waits to receive a message corresponding to an authentication, probe, or other message from the second device at block 815. In conjunction with the blocks 810, 812, and/or 815, the first device reconfigures itself to operate as the P2P group owner, if needed. In this manner, sufficient time for reconfiguration is allowed before expecting receipt of a message 815 from the second device.

If, in FIG. 8A at the block 808, the preference strength of the second device is greater than the preference strength of the first device (Your_GOPREF>My_GOPREF), or if the second device was selected by the tiebreaker at block 805, the method 800 continues to block 818. At block 818 the second device is determined to be the P2P group owner (Your_ROLE=GROUP OWNER) and the first device is determined to be the P2P client (My_ROLE=CLIENT). Further, at the block 818, the message timeout interval is set to the greater of the GOCT of the second device and the CCT of the first device (MSG_TO=max (Your_GOCT. My_CCT). Continuing on to FIG. 8B, the message timeout interval is correspondingly set at block 820. As, at this point, the first device has been determined to be the P2P client, the method 800 transmits a message 822 to the second device, typically upon expiration of the message timeout interval set at the block 820. In conjunction with the blocks 818, 820, and/or 822, the first device reconfigures itself to operate as the P2P client, if needed. In this manner, sufficient time for reconfiguration is allowed, thus increasing the probability that the second device is configured and prepared to receive the message and to properly process it. In some embodiments, the first device re-sets the message timeout interval after sending the message at block 822.

At block 825, it is determined whether a message is received before the message timeout interval has expired. If, as determined at the block 825, a message is received before the message timeout interval has expired, the message is processed accordingly at block 828. For example, if the received message corresponds to authentication, P2P authentication is continued at block 828. In other embodiments, a probe response, a probe request, a status message, an error message or some other message is received at the block 825 and processed accordingly at block 828.

If, as determined at the block 825, no message is received before the message timeout interval has expired, the message timeout interval is re-set at block 830. At block 832, another determination is made as to whether a message is received before the re-set message timeout interval has expired. If, as determined at the block 832, a message is received before the re-set message timeout has expired, the message is processed accordingly 828. For example, if the received message corresponds to authentication, P2P authentication is continued at block 828. In other embodiments, a probe response, a probe response, a probe request, a status message, an error message or some other message is received at the block 832 and processed accordingly at block 828. If, as determined at the block 832, a message is not received before the re-set message timeout interval, the method 800 indicates a failed connection between the first and the second devices at block 835.

In an embodiment, the number of times the message timeout interval is re-set is selectable and/or varies depending on conditions such as channel quality, known delays, etc. In another embodiment, the number of times the message timeout interval is fixed. The blocks 830 and 832 are repeated in accordance with the given number of re-sets. For example, a number of times the message timeout interval is re-set is selected and/or varies based on conditions such as channel quality and/or delay. In embodiments in which no re-sets of the message timeout interval occur, the blocks 830 and 832 are omitted from the method 800.

According to an embodiment, the method 800 is implemented by the wireless network adaptor 308. For example, according to an embodiment, the processor 322 at least partially implements the method 800 by executing machine readable instructions stored in the memory 325 or another memory (not shown in FIG. 3). In another embodiment, the processor 322 comprises hardware, such as an application specific integrated circuit (ASIC), a custom integrated circuit, a field programmable gate array (FPGA), a programmable logic array (PLA), a complex programmable logic device (CPLD), etc., and is configured to at least partially implement the method 800.

The methods of FIGS. 5, 8A and 8B may be implemented using hardware, a processor executing firmware instructions, a processor executing software instructions, or any combination thereof. When the methods of the present disclosure are implemented using a processor that executes firmware and/or software computer-executable instructions, the software or firmware instructions may be stored in a memory associated with the processor. More generally, the software or firmware instructions may be stored in any computer readable storage medium such as on a magnetic disk, an optical disk, or other storage medium, in a RAM or ROM or flash memory, processor, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

When implemented in hardware, the hardware may comprise one or more of discrete components, an integrated circuit, an application-specific integrated circuit (ASIC), a custom integrated circuit, a field programmable gate array (FPGA), a programmable logic array (PLA), a complex programmable logic device (CPLD), etc.

While the present invention has been described with reference to specific examples, which are intended to be illustrative only and not to be limiting of the invention, changes, additions or deletions in addition to those explicitly described above may be made to the disclosed embodiments without departing from the scope of the invention.

What is claimed is:

1. A method, comprising:
receiving, using a transceiver of a first device, a first message including a value indicative of a first timeout interval, wherein the first timeout interval is indicative of a time required for configuring a second device to operate as one of a peer-to-peer (P2P) group owner or a P2P client in a P2P wireless network, and wherein the configuring of the second device includes downloading, to the second device from a host computing device in which the second device is included, a set of machine readable instructions executable to operate the second device as the one of the P2P group owner or the P2P client;
determining a value of a second timeout interval based at least on the first timeout interval;
determining whether the second timeout interval expired;
determining whether a second message is received from the second device prior to the second timeout interval expiring; and
determining that a P2P connection with the second device failed based on determining that the second message was not received from the second device prior to the second timeout interval expiring.

2. The method of claim 1, wherein receiving the first message further includes receiving a value indicative of a third timeout interval, the third timeout interval indicative of a time required for configuring the second device to operate as the other one of the P2P owner or the P2P client, and
wherein the first timeout interval is one of the third timeout interval and the fourth timeout interval.

3. The method of claim 1, further comprising determining whether the second device is the P2P group owner or the P2P client;
wherein the first timeout interval is indicative of a time required for configuring the second device to operate as the P2P group owner if it is determined that the second device is the P2P group owner; and
wherein the first timeout interval is indicative of a time required for configuring the second device to operate as the P2P client if it is determined that the second device is the P2P client.

4. The method of claim 3, wherein:
the host computing device is a first host computing device and the set of machine readable instructions is a first set of machine readable instructions,
determining the value of the second timeout interval comprises determining a maximum of (i) the value of the first timeout interval and (ii) a value of a fourth timeout interval indicative of a time required for configuring the first device to operate as the P2P group owner or the P2P client, and
the configuring of the first device to operate as the P2P group owner or the P2P client includes downloading, to the first device from a second host computing device in which the first device is included, a second set of machine readable instructions executable to operate the first device as the P2P group owner or the P2P client.

5. The method of claim 4, wherein the fourth timeout interval is indicative of a time required for configuring the first device to operate as the P2P client if it is determined that the second device is the P2P group owner; and
    wherein the fourth timeout interval is indicative of a time required for configuring the first device to operate as the P2P group owner if it is determined that the second device is the P2P client.

6. The method of claim 5, further comprising determining whether the first device is the P2P group owner or the P2P client.

7. The method of claim 6, further comprising:
    receiving, using the transceiver of the first device, a value from the second device indicating a preference of the second device to be the P2P group owner;
    wherein determining whether the first device is the P2P group owner or the P2P client is based on the value indicating the preference of the second device to be the P2P group owner; and
    wherein determining whether the second device is the P2P group owner or the P2P client is based on the value indicating the preference of the second device to be the P2P group owner.

8. The method of claim 7, further comprising:
    transmitting, using the transceiver of the first device, a value to the second device indicating a preference of the first device to be the P2P group owner;
    wherein determining whether the first device is the P2P group owner or the P2P client is based on the value indicating the preference of the first device to be the P2P group owner; and
    wherein determining whether the second device is the P2P group owner or the P2P client is based on the value indicating the preference of the first device to be the P2P group owner.

9. The method of claim 8, further comprising determining whether the second timeout interval expired a determined number of times when it is determined that the second message from the second device was not received prior to the second timeout interval expiring a first time;
    wherein determining that the P2P connection with the second device failed is based on determining that the second message from the second device was not received prior to the second timeout interval expiring the determined number of times.

10. The method of claim 1, wherein the second message comprises a message associated with authentication.

11. An apparatus, comprising:
    a transceiver;
    a processor configured to:
        determine a value of a first timeout interval, the first timeout interval indicative of a time required for configuring a device separate from the apparatus to operate as a peer-to-peer (P2P) group owner or a P2P client in a P2P wireless network based on a first message received by the transceiver from the device separate from the apparatus, the configuring of the device including downloading, from a host computing device in which the device is included, a set of machine readable instructions executable to operate the device as the P2P group owner or the P2P client,
        determine a value of a second timeout interval based at least on the first timeout interval,
        determine whether the second timeout interval expired,
        determine whether the transceiver received a second message from the device separate from the apparatus prior the second timeout interval expiring, and
        determine that a P2P connection with the device separate from the apparatus failed based on determining that the second message from the device separate from the apparatus was not received prior to the second timeout interval expiring.

12. The apparatus of claim 11, wherein the processor is configured to determine the value of the first timeout interval based on at least one of:
    an indication in the first message of a value of a third timeout interval indicative of a time required for configuring the device separate from the apparatus to operate as the P2P group owner, or
    an indication in the first message of a value of a fourth timeout interval indicative of a time required for configuring the device separate from the apparatus to operate as the P2P client.

13. The apparatus of claim 12, wherein the processor is configured to determine whether the device separate from the apparatus is the P2P group owner or the P2P client;
    wherein the value of the first timeout interval is equivalent to the value of the third timeout interval if it is determined that the device separate from the apparatus is the P2P group owner; and
    wherein the value of the first timeout interval is equivalent to the value of the fourth timeout interval if it is determined that the device separate from the apparatus is the P2P group owner.

14. The apparatus of claim 13, wherein:
    the host computing device is a first host computing device and the set of machine readable instructions is a first set of machine readable instructions, and
    the processor is configured to:
        determine a maximum of (i) the value of the first time out interval and (ii) a value of a fifth timeout interval indicative of a time required for configuring the apparatus to operate as the P2P group owner or the P2P client, the configuring of the apparatus including downloading, to the apparatus from a second host computing device in which the apparatus is included, a second set of machine readable instructions executable to operate the apparatus as the P2P group owner or the P2P client, and
        determine the value of the second timeout interval based on the maximum of (i) the value of the first time out interval and (ii) the value of the fifth timeout interval.

15. The apparatus of claim 14, wherein the value of the fifth timeout interval is equivalent to a value of a sixth timeout interval indicative of configuring the apparatus to operate as the P2P client if it is determined that the device separate from the apparatus is the P2P group owner; and
    wherein the value of the fifth timeout interval is equivalent to a value of a seventh timeout interval indicative of configuring the apparatus to operate as the P2P group owner if it is determined that the device separate from the apparatus is the P2P client.

16. The apparatus of claim 15, wherein the processor is configured to determine whether the apparatus is the P2P group owner or the P2P client.

17. The apparatus of claim 16, wherein the processor is configured to:
    determine a value indicating a preference of the device separate from the apparatus to be the P2P group owner based on data received from the device separate from the apparatus via the transceiver;

determine whether the apparatus is the P2P group owner or the P2P client based on the value indicating the preference of the device separate from the apparatus to be the P2P group owner; and determine whether the device separate from the apparatus is the P2P group owner or the P2P client based on the value indicating the preference of the device separate from the apparatus to be the P2P group owner.

18. The apparatus of claim 17, wherein the processor is configured to:

cause the transceiver to transmit a value to the device separate from the apparatus indicating a preference of the apparatus to be the P2P group owner;

determine whether the apparatus is the P2P group owner or the P2P client based on the value indicating the preference of the apparatus to be the P2P group owner; and determine whether the device separate from the apparatus is the P2P group owner or the P2P client based on the value indicating the preference of the apparatus to be the P2P group owner.

19. The apparatus of claim 18, wherein the processor is configured to:

determine whether the second timeout interval expired a determined number of times when it is determined that the second message from the device separate from the apparatus was not received prior to the second timeout interval expiring a first time;

determine that the P2P connection with the device separate from the apparatus failed based on determining that the message from the device separate from the apparatus was not received prior to the second timeout interval expiring the determined number of times.

20. The apparatus of claim 11, further comprising a memory coupled to the processor;

wherein the processor is configured to execute machine readable instructions stored in the memory.

21. A computer readable storage medium storing machine readable instructions that, when executed by a processor of first device, cause the processor to:

determine a value of a first timeout interval, the first timeout interval indicative of a time required for configuring a second device to operate as a peer-to-peer (P2P) group owner or a P2P client in a P2P wireless network based on a first message received by a transceiver of the first device from the second device, and the configuring of the second device including downloading, from a host device in which the second device is included, a set of machine readable instructions executable to operate the second device as the P2P group owner or as the P2P client;

determine a value of a second timeout interval based at least on the first timeout interval;

determine whether the second timeout interval expired;

determine whether the transceiver received a second message from the second device prior the second timeout interval expiring; and determine that a P2P connection with the second device failed based on determining that the second message from the second device was not received prior to the second timeout interval expiring.

22. A method, comprising:

executing a first set of machine readable instructions stored in a memory of a wireless network adaptor of a host computing device using a processor of the wireless network adaptor to communicate over an infrastructure wireless local area network (WLAN) via an access point of the infrastructure WLAN;

executing a second set of machine readable instructions stored in the memory of the wireless network adaptor using the processor of the wireless network adaptor to a peer-to-peer (P2P) group owner negotiation with another P2P device via a P2P wireless network;

wherein the first set of machine readable instructions and the second set of machine readable instructions are stored in the memory of the wireless network adaptor simultaneously;

executing the second set of machine readable instructions stored in the memory of the wireless network adaptor using the processor of the wireless network adaptor to determine an identity of the wireless network adaptor as a P2P group owner or a P2P client;

downloading a third set of machine readable instructions from a memory of the host computing device to the memory of the wireless network adaptor, wherein the third set of machine readable instructions, when executed by the processor of the wireless network adaptor, cause the wireless network adaptor to operate as the determined identity; and reconfiguring, using the downloaded third set of machine readable instructions, the wireless network adaptor to operate in the P2P wireless network according to the determined identity.

23. An apparatus included in a host computing device, the apparatus comprising:

a transceiver;

a memory;

a processor coupled to the memory;

wherein machine readable instructions stored in the memory, when executed by the processor, cause the processor to:

cause the transceiver to communicate with an access point of an infrastructure wireless local area network (WLAN);

cause the transceiver to transmit messages to a device separate from the apparatus, the messages corresponding to a peer-to-peer (P2P) group owner negotiation;

determine an identity of the apparatus as a P2P group owner or a P2P client;

based on the determined identity of the apparatus, download a set of machine readable instructions from a memory of the host computing device to the memory of the apparatus, the set of machine readable instructions to cause the apparatus to operate as the determined identity; and reconfigure, using the downloaded set of machine readable instructions, the apparatus to operate in a P2P wireless network according to the determined identity.

* * * * *